United States Patent [19]

Holtey et al.

[11] 4,290,104

[45] Sep. 15, 1981

[54] COMPUTER SYSTEM HAVING A PAGING APPARATUS FOR MAPPING VIRTUAL ADDRESSES TO REAL ADDRESSES FOR A MEMORY OF A MULTILINE COMMUNICATIONS CONTROLLER

[75] Inventors: Thomas O. Holtey, Newton; Robert C. Miller, Braintree; Kin C. Yu, Burlington, all of Mass.

[73] Assignee: Honeywell Information Systems Inc., Waltham, Mass.

[21] Appl. No.: 463

[22] Filed: Jan. 2, 1979

[51] Int. Cl.³ .......................... G06F 9/06; G06F 9/36
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,251,041 | 5/1966 | Chu et al. | 364/200 |
| 3,267,462 | 8/1966 | Gabriel | 343/6.8 |
| 3,284,778 | 11/1966 | Trauboth | 364/200 |
| 3,461,433 | 8/1969 | Emerson | 364/200 |
| 3,902,164 | 8/1975 | Kelley et al. | 364/200 |
| 3,909,798 | 9/1975 | Wallach et al. | 364/200 |
| 3,938,096 | 2/1976 | Brown et al. | 364/200 |
| 4,010,451 | 3/1977 | Kibble et al. | 364/200 |
| 4,130,870 | 12/1978 | Schneider | 364/200 |
| 4,131,883 | 12/1978 | Lundstrom | 364/900 |

OTHER PUBLICATIONS

*Computer Organization and the System/370*-Katzan, Jr., 1971, Van Nostrand Reinhold Co., N.Y.

*Primary Examiner*—Harvey E. Springborn
*Attorney, Agent, or Firm*—Nicholas Prasinos

[57] ABSTRACT

A paging apparatus includes addressing hardware for addressing a number of physical devices coupled to various communication buses, for mapping virtual addresses to real addresses, and controlling the flow of data. The paging apparatus generates 8 control signals, 5 of which modify a virtual address into a real address of a memory thereby expanding the capabilities of the real address from 256 address locations by an additional 512 address locations. The remaining 3 control signals control the flow of data by enabling or disabling data control apparatus in the physical devices.

11 Claims, 6 Drawing Figures

| PAGING PROM MAP ||||||||||||
|---|---|---|---|---|---|---|---|---|---|---|---|
| VIRTUAL ADDRESS HEX. | PROM ADDRESS | PROM DEC. LOC. | HEX MAP AT LOC. | BINARY MAP AT LOC. |||||||| 
| | | | | 7 | 6 | 5 | 4 | 3 | 2 | 1 | 0 |
| 0000-7 | 140 | 0 | 7F | 0 | 1 | 1 | 1 | 1 | 1 | 1 | 1 |
| 8-F | 150 | 1 | 7F | 0 | 1 | 1 | 1 | 1 | 1 | 1 | 1 |
| 10-17 | 160 | 2 | 7F | 0 | 1 | 1 | 1 | 1 | 1 | 1 | 1 |
| 18-19 | 170 | 3 | 7F | 0 | 1 | 1 | 1 | 1 | 1 | 1 | 1 |
| 20 | 180 | 4 | 7F | 0 | 1 | 1 | 1 | 1 | 1 | 1 | 1 |
| 28 | 190 | 5 | 7F | 0 | 1 | 1 | 1 | 1 | 1 | 1 | 1 |
| 30 | 200 | 6 | 7F | 0 | 1 | 1 | 1 | 1 | 1 | 1 | 1 |
| 38 | 210 | 7 | 7F | 0 | 1 | 1 | 1 | 1 | 1 | 1 | 1 |
| 40 | 220 | 8 | 3F | 0 | 0 | 1 | 1 | 1 | 1 | 1 | 1 |
| 48 | 230 | 9 | 3F | 0 | 0 | 1 | 1 | 1 | 1 | 1 | 1 |
| 50 | 240 | 10 | 3F | 0 | 0 | 1 | 1 | 1 | 1 | 1 | 1 |
| 58 | 250 | 11 | 3F | 0 | 0 | 1 | 1 | 1 | 1 | 1 | 1 |
| 60 | 260 | 12 | 0F | 0 | 0 | 0 | 0 | 1 | 1 | 1 | 1 |
| 68 | 270 | 13 | FF | 1 | 1 | 1 | 1 | 1 | 1 | 1 | 1 |
| 70 | 280 | 14 | FF | 1 | 1 | 1 | 1 | 1 | 1 | 1 | 1 |
| 78 | 290 | 15 | FF | 1 | 1 | 1 | 1 | 1 | 1 | 1 | 1 |
| 80 | 300 | 16 | 2E | 0 | 0 | 1 | 0 | 1 | 1 | 1 | 0 |
| 88 | 310 | 17 | 66 | 0 | 1 | 1 | 0 | 0 | 1 | 1 | 0 |
| 90 | 320 | 18 | 6C | 0 | 1 | 1 | 0 | 1 | 1 | 0 | 0 |
| 98 | 330 | 19 | FF | 1 | 1 | 1 | 1 | 1 | 1 | 1 | 1 |
| A0 | 340 | 20 | EA | 1 | 1 | 1 | 0 | 1 | 0 | 1 | 0 |
| A8 | 350 | 21 | EC | 1 | 1 | 1 | 0 | 1 | 1 | 0 | 0 |
| B0 | 360 | 22 | EC | 1 | 1 | 1 | 0 | 1 | 1 | 0 | 0 |
| B8 | 370 | 23 | FF | 1 | 1 | 1 | 1 | 1 | 1 | 1 | 1 |
| C0 | 380 | 24 | EA | 1 | 1 | 1 | 0 | 1 | 0 | 1 | 0 |
| C8 | 390 | 25 | 6E | 0 | 1 | 1 | 0 | 1 | 1 | 1 | 0 |
| D0 | 400 | 26 | 6E | 0 | 1 | 1 | 0 | 1 | 1 | 1 | 0 |
| D8 | 410 | 27 | FF | 1 | 1 | 1 | 1 | 1 | 1 | 1 | 1 |
| E0 | 420 | 28 | EA | 1 | 1 | 1 | 0 | 1 | 0 | 1 | 0 |
| E8 | 430 | 29 | FF | 1 | 1 | 1 | 1 | 1 | 1 | 1 | 1 |
| F0 | 440 | 30 | FF | 1 | 1 | 1 | 1 | 1 | 1 | 1 | 1 |
| F8 | 450 | 31 | EE | 1 | 1 | 1 | 0 | 1 | 1 | 1 | 0 |

COMPUTER SYSTEM HAVING A PAGING APPARATUS FOR MAPPING VIRTUAL ADDRESSES TO REAL ADDRESSES FOR A MEMORY OF A MULTILINE COMMUNICATIONS CONTROLLER

RELATED APPLICATIONS

The following U.S. Patent applications filed on an even date with the instant application and assigned to the same assignee as the instant application are related to the instant application.

1. "Multi-Way Vectored Interrupt Capability" by Thomas O. Holtey and Kin C. Yu, and having U.S. Ser. No. 000,402.
2. "Hardware for Extending Microprocessor Addressing Capability" by Thomas O. Holtey and Robert C. Miller, and having U.S. Ser. No. 000,304.
3. "I/O Request Interrupt Mechanism" by Thomas O. Holtey, and having U.S. Ser. No. 000,315.
4. "I/O Priority Resolver" by Thomas O. Holtey, and having U.S. Ser. No. 000,477.
5. "Hardware for Remote Maintenance of Computer Systems" by Thomas O. Holtey and Kin C. Yu, and having U.S. Ser. No. 000,314.

BACKGROUND OF THE INVENTION

1. Field of the Invention

The invention relates to data processing systems and more particularly to addressing apparatus utilizing an improved paging mechanism.

2. Description of the Prior Art

Normally, a computer memory stores both operands and computer commands or instructions. Operands are generally data which is to be operated upon, and commands are instructions which collectively form a computer program. An instruction word normally includes a command portion which addresses a location in the computer memory. The number of locations in memory which can be addressed by a given instruction via binary notation depends on the number of bits allocated to the address portion of the instruction word and the hardware responsive to those bits. Normally, instruction words are comprised of eight bit bytes, although any other number of bits may be utilized in a byte. Also it is not uncommon for the address portion of an instruction to include one, two, three or more bytes. An address portion of an instruction having only one, eight bit byte can only address $2^8 = 256$ locations in memory, whereas an address portion having two, eight bit bytes can address $2^{16} = 65,536$ locations. Although more memory locations can be addressed with two, eight bit bytes, more time, and a greater number of cycles are necessary in fetching each address word from memory and executing it. Furthermore, more memory space is necessary in storing the larger words. With the trend toward minicomputers and microprocessors, computer memory and throughput are at a premium. Accordingly, what is required for minicomputers, microprocessors and communication processors, is an improved addressing mechanism which will permit greater addressing capability with a minimum of computer cycle time in fetching the address portion of an instruction.

The prior art is replete with memory addressing devices which have been designed to improve the addressing of computer main memories. A typical computer main memory may have a straightforward addressing mechanism with the ability to address any desired number of characters beginning with any randomly selected position.

Instructions stored in main memory are generally stored in contiguous locations in groups so that the group comprises a computer program. Accordingly, it is generally not necessary to fetch another address to locate the second instruction and so on, because the original address can be modified by adding the number one to the address already fetched (or some other number) thus indexing it to the next contiguous location to be fetched.

Other modification techniques comprise indexregisters which are addressed by the original address and either replace or modify the original address to give a new address for the operand to be fetched. A typical device of this type is disclosed by H. Trauboth in U.S. Pat. No. 3,284,778 issued Nov. 8, 1966.

Further refinements to the computer addressing techniques led to relative addressing wherein the address portion of an instruction does not refer to the absolute memory address desired but to some relative address such as a page or segment located in main memory. This page or segment can be located relative to the beginning of the segment or page. Accordingly, hardware can concatenate the relative address within a segment or page with the location of the beginning of that segment or page within main memory to locate the absolute address. Typical of this type of apparatus is the U.S. Pat. No. 3,938,096 to James L. Brown, et al issued Feb. 10, 1976, and U.S. Pat. No. 3,461,433 issued to W. C. Emerson on Aug. 12, 1969.

Still other addressing schemes increase speed and throughput by making use of a high speed-small capacity memory to supplement main memory, and to which addresses are prefetched prior to their use by the addressing mechanism. Hence speed in addressing is attained. Typical of this type device is that disclosed by Yohan Chu in U.S. Pat. No. 3,251,041 issued May 10, 1966.

To increase main memory capacity a virtual memory system was devised wherein the operating system such as that used in the IBM System 370 maps addresses resident on magnetic disk on to main memory. The user addresses main memory and the appearance to the user is that he has a vast capacity of main memory. (See Computer Organization and the System/370 by Harry Katzan Jr., published in 1971 by Van Nostrand Reinhold Company of New York.) This is some of the prior art relating to memory addressing schemes of which the applicants are aware. It is presented as background information and no implication should be drawn that this is the closest prior art to the invention or that a search has been made.

All these schemes have generally been directed to large computer systems and generally require additional hardware such as index registers and buffer-memories. Moreover, memory space is not as much at a premium for large computers as with small computers.

What is required of the small computer is an improved address modification system which utilizes the hardware of the basic addressing mechanism and at the same time minimizes cycle time for accessing multiple address words.

OBJECTS OF THE INVENTION

It is a primary object of the invention to provide an improved computer main memory addressing mechanism.

It is another object of the invention to provide an improved computer memory addressing mechanism having improved address modification.

It is still another object of the invention to provide an improved computer memory addressing mechanism which requires a minimum space for storage of addresses.

It is still another object of the invention to provide an improved computer memory addressing mechanism which requires a minimum of addressing cycles.

It is still a further object of the invention to provide improved mapping of virtual addresses to real addresses.

SUMMARY OF THE INVENTION

The foregoing objects are achieved according to one embodiment of the invention by providing addressing hardware for addressing various physical devices coupled to various communication buses, for mapping of virtual addresses to real addresses, and controlling flow of data.

Five bits of an eight bit address are utilized to address a paging signal generator to typically generate eight control signals. These eight control signals are utilized to modify the eight bit address (which can normally address only 256 locations by 8 bits per address location in main memory) to provide additional addressing capability for the eight bit address. When the control signal is active for a particular bit, that bit is modified or another bit is substituted. When the control signal is not active the original bit in the address is utilized.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

DETAILED DESCRIPTION OF THE INVENTION

Figure 1A:
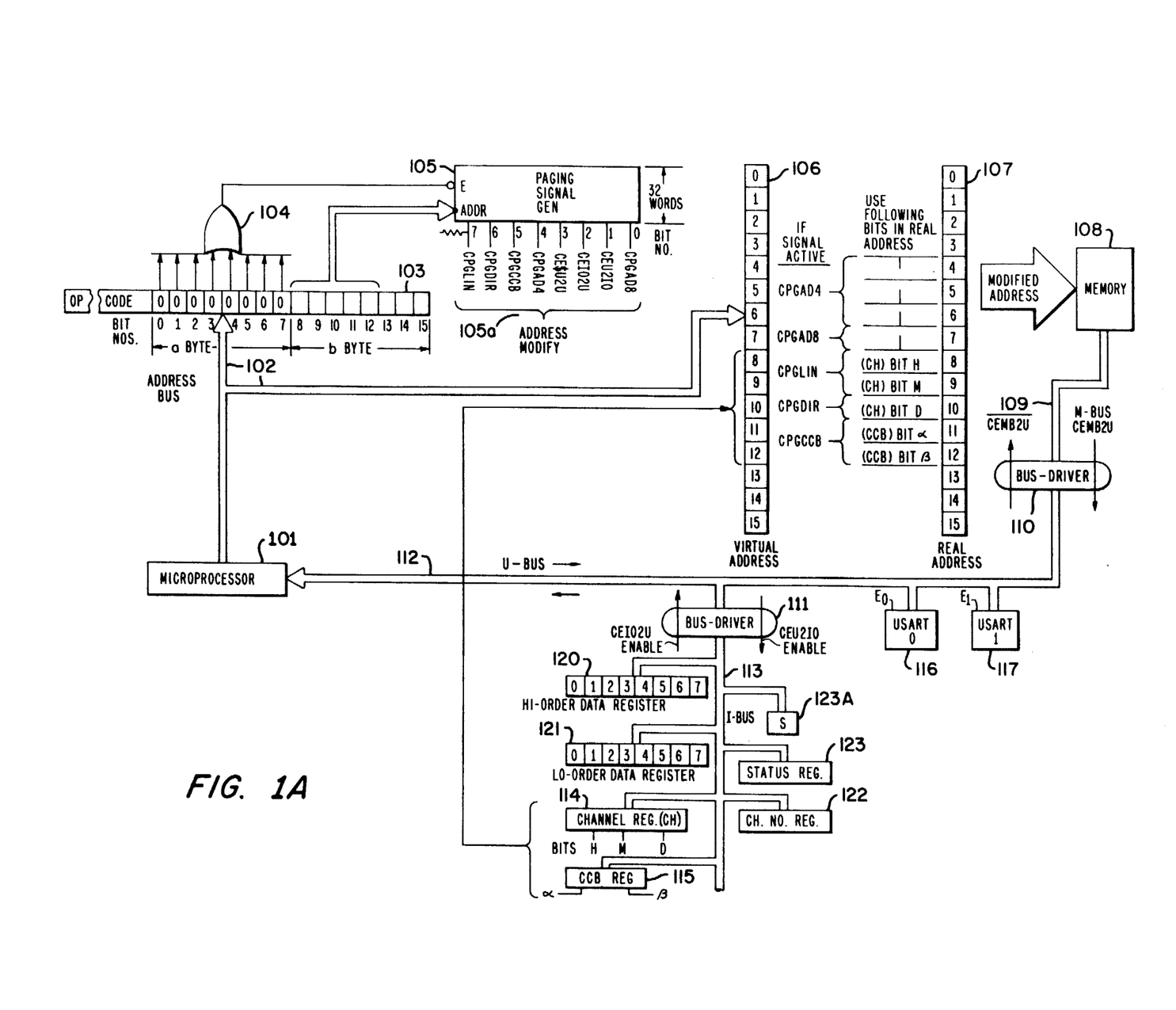
FIG. 1A is a schematic block diagram of the preferred embodiment of the invention.
Figure 1B:
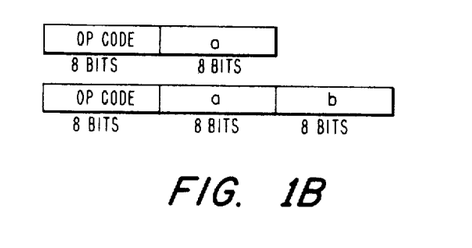
FIG. 1B is a schematic diagram of typical addressing formats of the invention.

Referring to FIG. 1A there is shown a logic block diagram of a preferred embodiment of the invention which also shows information flow and modification of the information for improved addressing. A microprocessor 101 is typically a type 6800 commercially available from Motorola Inc. and utilizes a 16 bit address bus 102 to address main memory 108. This provides an addressing capability of over 64,000 bytes of main memory 108. (The 6800 is described in "The Complete Motorola Microcomputer Data Library", Series A, Motorola Inc. 1978 by Motorola Semiconductor Products, Box 20912, Phoenix, Ariz.) The formats of the instruction are shown on FIG. 1B. There are primarily two formats: one having an eight bit op code and an 8 bit (a) byte whereas the other one has an 8 bit op code, and 8 bit (a) byte and an 8 bit (b) byte. In order to conserve pace and cycle time, it is more advantageous to use only the (b) byte. Accordingly, in the schematic representation of FIG. 1A, the register 103 utilizes the first 5 high order bits 8, 9, 10, 11, and 12 to address the paging signal generator 105. (The paging signal generator is an integrated circuit memory chip of the type designated as 5610 and commercially available from Intersil. Inc. The 5610 is described in the "Intersil Semiconductor Products Catalog" by Intersil Inc., 10900 North Tantau Avenue, Cupertino, Calif., publiished October, 1974.) The paging signal generator 105 stores 32 words which can be addressed by bits 8-12 of the (b) byte. Since 5 bits are utilized to address the paging signal generator they can be utilized to address any of the 32 words therein. The internal circuitry of the generator 105 is such so that when the first 8 words (up to address 07) are addressed, signal CPGLIN is activated (i.e., goes low). When the next four words of the signal generator 105 are addressed (i.e., addresses 8-11) then both signals CPGLIN and CPGDIR and activated. When the next location word 13 (i.e., address 12) is addressed then all of the following signals are activated (i.e., go low): CPGLIN, CPGDIR, CPGCCB and CPGAD4. The paging signal generator 105 is enabled when a low output signal from the microprocessor 101 is present at its E input terminal. A low input signal is provided to the E input terminal of paging signal generator 105 from the output of OR gate 104 when all of its inputs bits 1-8 of (a) byte are 0 or low. These bits 1-8 of (a) byte are made 0 when it is desired to modify the 16 bit address provided by the (a) and (b) byte. Accordingly, when all the bits of the (a) byte are 0, a low signal results at the output of OR gate 104 which is applied to the E input terminal of paging signal generator 105 thus enabling it. When the paging signal generator 105 is enabled one of the control signal locations 105a is addressed by bits 8-12 of (b) byte. When selected ones of these control signals 105a are active (i.e. low) the 16 bit virtual address 106 is modified to the real address 107 which then addresses main memory 108. If none of the control signals 105a are active, then the 16 bit address 106 is identical to the 16 bit address 107 and no modification occurs for addressing memory 108. (The mechanism for performing this modification will be discussed in detail in relation to FIG. 3.) Assuming, therefore that control signal CPGCCB is active then bit 11 of the virtual address is replaced by the bit in position α of CCB register 115 and bit 12 will be replaced by bit β in CCB register 115 to form the real address. If control signal CPGDIR is active, then bit 10 of the virtual address is replaced by bit D of channel register 114. If control signal CPGLIN is active, then bit 9 of the virtual address is replaced by bit M of the CH register 114, and bit 8 of the virtual address is replaced by bit H of the CH register 114. If control signal CPGAD8 is active, then bit 7 of virtual address is replaced by a one. Finally, if control signal CPGAD4 is active, then bits 4, 5, 6 of the virtual address are replaced by a one.

Figure 2A:
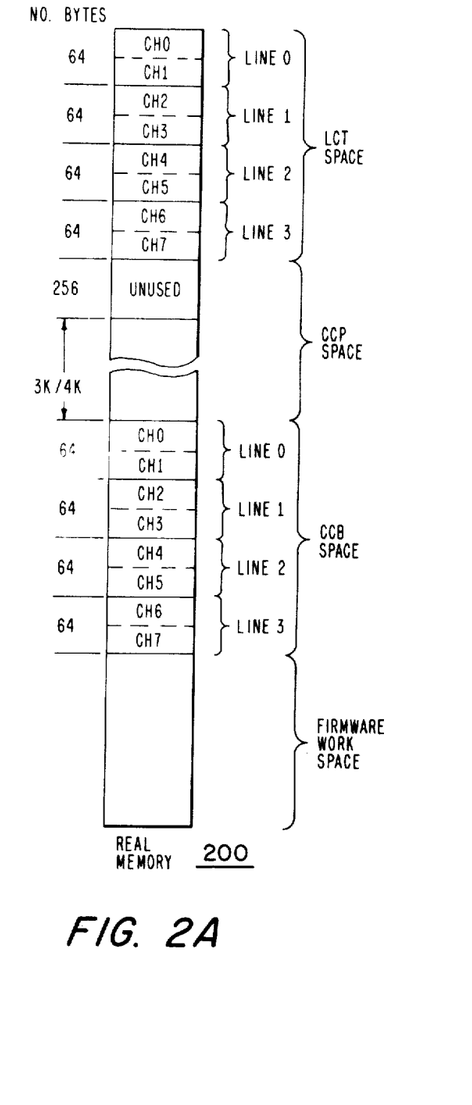
FIG. 2A is a schematic diagram of a typical organization of the real memory of the invention.

The CE$U2U control signal generated by the paging signal generator 105 is utilized to address the line number of a selected Programmable Communications Interface commonly known as a Universal Synchronous Asynchronous Receiver Transmitter (USART) 116, 117. (USAART's are commercially available from Intel Corporation and are of the Programmable Communications Interface 8251A. The 8251A is described in the "Intel Component Data Catalog 1978" published by Intel Corporation, 3065 Bowers Avenue, Santa Clara, Calif.) The CEIO2U control signal enables the I-bus 113 via bidirectional bus driver 111. (These bidirectional bus drivers are commercially available from Texas Instrument and are designated as type 74LS245 The 74LS245 is described in "The TTL Data Book for Design Engineers", Second Edition copyright 1976 by Texas Instrument.) The CEIO2U signal permits communication from the I-bus 113 to the U-bus 112, whereas a CEU2IO signal permits communication from the U-bus-112 to the I-bus 113. The I-bus may have various registers attached for storing communications information. Some typical registers such as HI-Order Data Register 120, LO-Order Data Register 121, channel no. register 122, and status register 123. These registers communicate with the microprocessor via the I-bus 113 and the U-bus 112, and with main memory 108 via I-bus 113 and M-bus 109. In order for the various registers on the I-bus 113 to communicate with main memory 108 and microprocessor 101, it is necessary to assign space in main memory for various lines and channels associated with any communication port. Referring therefore to FIG. 2A, it will be seen that real memory 200 has a portion of its area reserved for lines 0-3. Each line is comprised of 64 bytes and the total 4 lines 0-3 comprise the Logical Table (LCT) space. Each line 0-3 is furthermore subdivided into 2 channels of 32 bytes each. Accordingly, there are 8 channels of 32 bytes comprising 4 lines of 64 bytes each which comprise the LCT space. The next 256 bytes are reserved for Channel Command Programs (CCP) use. There are also 3 to 4K bytes which together with the unused space are reserved for Channel Command Programs (CCP). Below this space there is an additional 256 bytes reserved for the Channel Control Block (CCB). As with the LCT space, each line 0-3 is associated with one CCB of 64 bytes each of which is subdivided into 2 channels of 32 bytes each. Below this is memory space reserved as firmware work space. Accordingly, it can be seen that each line 0-3 is associated with one LCT space and one CCB space, each of which is subdivided into two channels. Part of the addressing mechanisn described supra with FIG. 1A addresses all of these memory spaces. However, to do this it takes two address bytes a and b since one address byte is comprised of 8 bits and 8 bits can address only 256 locations. Yet as can be seen from FIG. 2A, there are 768 locations (3×256) excluding the 3K/4K locations. These 256 locations are the most commonly addressed since communication of lines 0-3 must constantly be had with its LCT's, its CCB's and the firmware. It is very inefficient to utilize the 16 bit address which can normally address over 64,000 locations merely to address 768 locations, yet only one 8 bit address can address only 256 locations. This invention permits the 768 locations to be addressed by the first 5 bits 8-12 of the (b) byte 103 by permitting the modification of the virtual address of FIG. 2B as discussed supra. Hence, cycle time and storage space are saved by this short form of addressing.

Figure 1C:
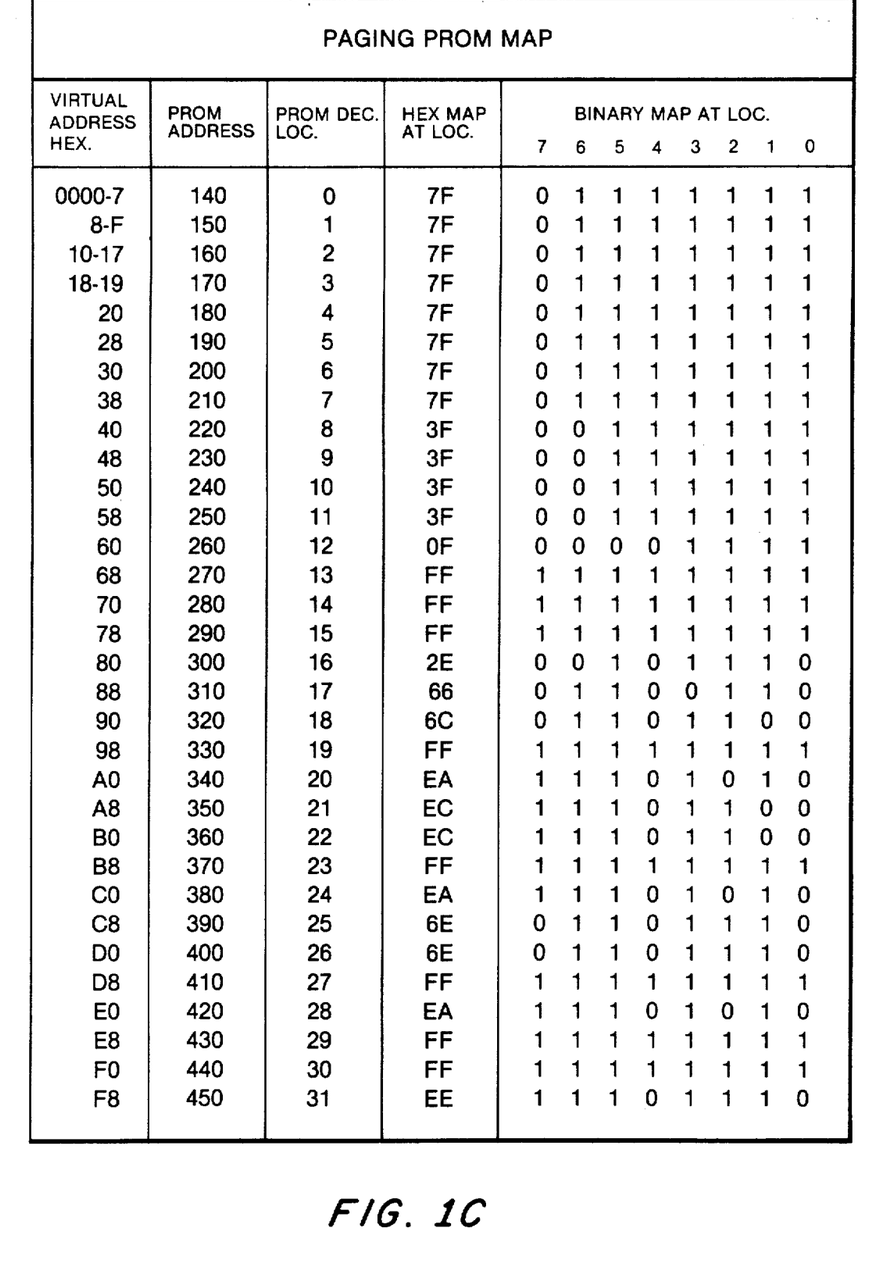
FIG. 1C is a map of the paging PROM.

Referring to FIG. 1C, there is shown the map of the Paging Signal Generator 105 (i.e., Paging PROM 300). The map is self-explanatory. The address locations are shown in various numbering systems on the first 3 columns, whereas the last column contains the actual information stored at that address location. The fourth column designates the hexadecimal locations which have similar contents.

Figure 2B:
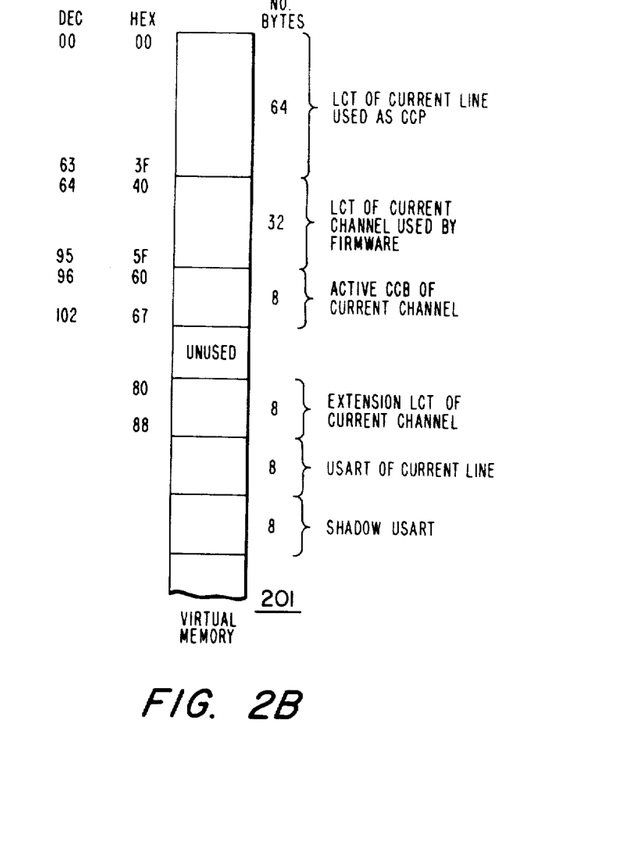
FIG. 2B is a schematic diagram of a typical organization of the virtual memory of the invention.

Referring to FIG. 2B, there is shown 256 locations in memory 201 reserved for virtual memory. The first 64 locations or bytes are numbered in decimal notation 0 through 63 and in hexadecimal notation 0 through 3F, and comprise the LCT of the current line used by the CCP. The next 32 locations or bytes, decimal locations 64-95 and in hexadecimal notation 40-5F, are reserved for the LCT of the current channel used by firmware. The next 8 locations or bytes denoted in decimal notation 96-102 and in hexadecimal notation 60-67 are reserved for the active CCB of the current channel. There is then an unused space and there are 3 eight byte locations reserved for the USART of the current line, the shadow USART of the current line respectively and the extension of LCT of the current channel.

A typical example will illustrate how the improved addressing scheme of the invention works. Assume, therefore, that location 5 of line 0 of virtual memory 201 is to be addressed. Accordingly, all of the bits 0 through 7 of (a) byte of register 103 would be 0 which would enable OR gate 104 and enable the paging signal generator 105. The next 5 bits, 8 through 12, would also be 0, whereas bit 13 would be a 1, bit 14 would be 0 and bit 15 would be a one thus giving the binary address 101 or decimal 5. The virtual address 106 would also have bits 0 through 12 equal to 0 with bit 13 being 1, bit 14 being 0 and bit 15 being 1. Additionally, however, since bits 8-12 of the (b) byte in register 103 are 0, control signal CPGLIN would be active. (It was seen supra that if bits 8-12 were utilized to address the first 8 words in the paging signal generator 105, signal CPGLIN would be active or low.) With signal CPGLIN active, bits 8 and 9 of the virtual address 106 would be replaced by bits H and M respectively of channel register 114. Under our assumption which initially was that we are addressing location 5 of line 0, bits H and M of channel register 114 would be 0 and accordingly bits 8 and 9 of real address 107 would also be 0. Thus the final real address would have bits 0-12 equal to 0, bit 13 would be a 1, bit 14 would be a 0, and bit 15 would be a 1, thus addressing the fifth location of line 0 of real memory.

To take this problem one step further, assume now that the fifth location in line 1 is now to be addressed. The bit contents of register 103 and virtual address 106 would be identical as in the prior example. However, since line 1 is now being addressed the channel register 114 would have a 0 in its high order bit H and a 1 in its next order bit M. Accordingly, when signal CPGLIN is activated once again (since bits 8-12 of the (b) byte of register 103 are all zeroes) bit 8 of virtual address 106 would be replaced by bit H of channel register 114 which is a 0 and bit number 9 of virtual address 106 would be replaced by the mid bit M of channel register 114 which in this example is a 1, since line 1 is being addressed. Hence the real address 107 would have zeroes in bit positions 0 through 8, bit 9 would be a 1, bits 10-12 would remain 0, and bit 13 would still be a 1, bit 14 would still be 0, and bit 15 would still be a 1. Accordingly, now hexadecimal location 45 is addressed in real memory which is the fifth location of line 1. It can readily be seen by this reasoning that at location 5, line 2 or line 3 could be similarly addressed merely by substituting bits H and M of the channel register 114 for bits 8 and 9 of the virtual address 106 to obtain the real address 107.

Figure 3:
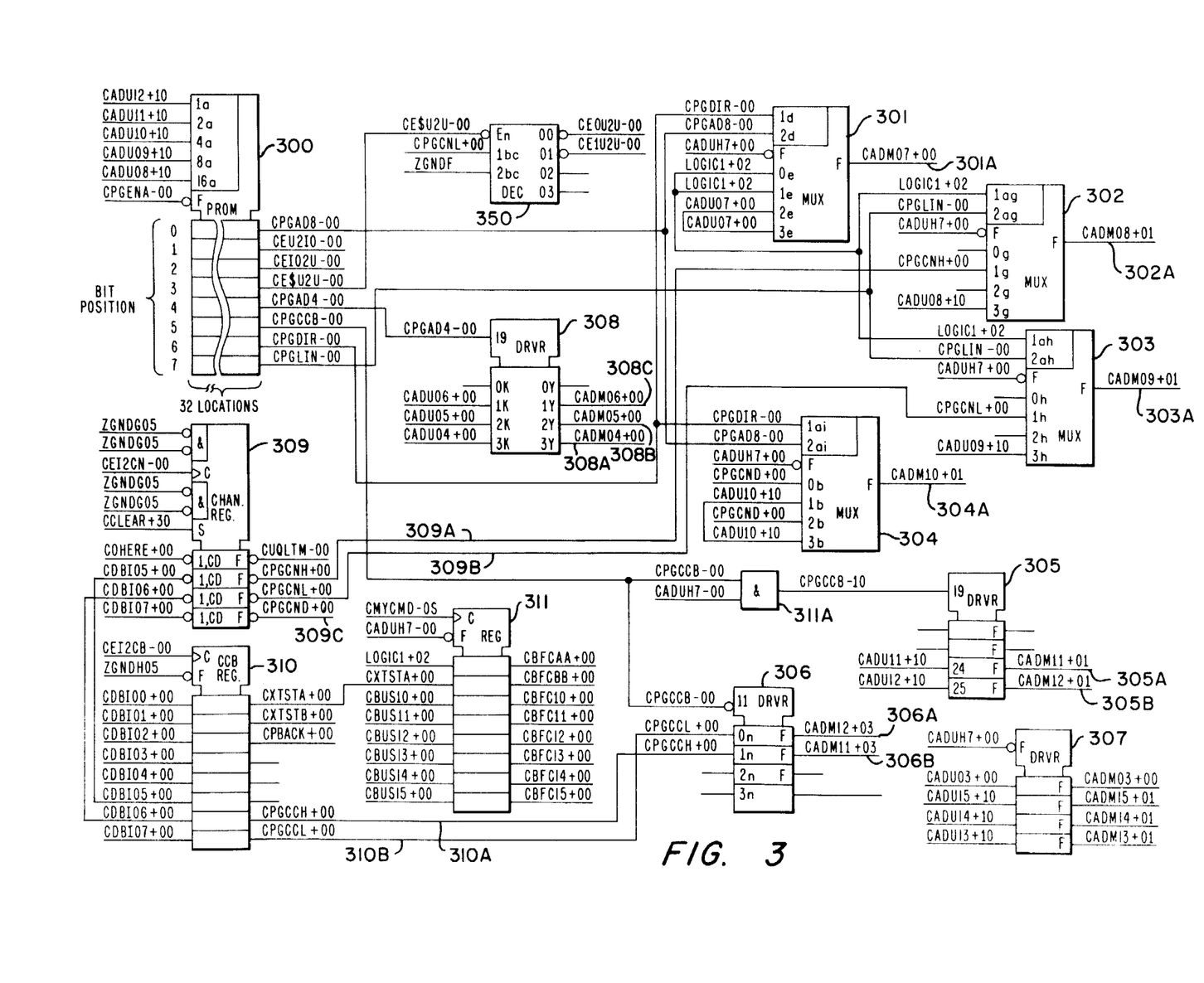
FIG. 3 is a logic block diagram of the preferred embodiment of the invention.

Referring to FIG. 3, there is shown the detailed logic block diagram of the paging apparatus for improved mapping of virtual addresses to real addresses. First a structural description will be given wherein the various structures of FIG. 3 will be identified and tied into FIG. 1A where feasible; secondly, the operation of the structure of FIG. 3 will be described to show the various functions performed. It should be noted from FIG. 1A supra that the paging mechanism is designed to modify bits 4 through 12 of virtual address format 106 to provide the final real address 107 with bits 4 through 12 either modified or not in accordance with the signals presented. On FIG. 3 it should be noted that multiplexers (MUX) 302, 303, and 304 and driver 305 provide the output signals respectively on lines 302A, 303A, 304A, 305A and 305B which represent modified bits 8 through 12 of the real address 107. Multiplexer (MUX) 301 and driver 308 provide the output signals in line 301A, 308A, 308B, and 308C which represent bits 4 through 7 of the modified real address 107. Register 309 corresponds to register 114 of FIG. 1A and stores bits H, M and D and provides these bits as output signals on lines 309A, 309B and 309C. Register 310 corresponds to CCB register 115 on FIG. 1A and stores and provides the α and β bits as signal output on lines 310A and 310B respectively. PROM 300 corresponds to paging signal generator 105. As described supra, it provides the various signals for mapping the virtual address 106 into the real address 107. The map of PROM 300 corresponds to FIG. 1C. Drivers 305 and 306 are coupled with AND gate 311A to provide the real memory address bits 11 and 12. Register 311 is utilized to store various signals.

Each of these devices is commercially available from such manufacturers as Texas Instrument, Motorola, Intel and other semiconductor manufacturers in accordance to their universal designations as shown in Table I below:

TABLE I

| Type of Device and Numeral Designation | Commercial Identification Number |
| --- | --- |
| MUX301, 302, 303 and 304 | 74LS253 |
| Drivers 305, 306, 307 and 308 | 74LS241 |
| Registers 309 and 114 | 74173 |
| Registers 310 and 311 | 74LS374 |
| AND gate 311A | 74LS08 |
| PROM 300 | 5610 |

The 74 series circuits are listed in "The TTL Data Book for Design Engineers", Second Edition, copyright 1976 by Texas Instruments. The 5610 is listed in the "Intersil Semiconductor Products Catalog", published in 1974 by Intersil Inc. Referring once again to FIG. 3, the operation and function of the paging apparatus for improved mapping of virtual addresses to real addresses will be described in greater detail. As has been discussed supra with respect to FIG. 1A, when addresses 0 through 7 of PROM chip 300 are addressed the communication paging line signal (CPGLIN) becomes active by going low. Ths is shown on the Paging PROM Map of FIG. 1C, wherein the contents of the map in the first 8 positions are 01111111. Bit position 7 is 0, or low, which activates signal CPGLIN. This signal is then applied to input terminal 2ag and 2ah of multiplexers (MUX) 302 and 303 respectively. The other input control signal to input terminals 1ag and 1ah of multiplexers 302 and 303 respectively is the logic 1 (LOGIC1) signal which is wired to always be high. When signal CPGLIN is active (i.e., in the low state) it addresses input terminals 1ag and 1ah of multiplexers 302 and 303 respectively which means that the signals on input terminals 1g and 1h will pass through as outputs on lines 302A and 303A respectively. By following the signals (CPGCNH) on input terminal 1g of multiplexer 302 back to its source, it will be observed that it comes from the high order bit on line 309A of channel register 309. Similarly, following the input signal (CPGCNL) on input terminal 1h of MUX 303 back to its source shows that it comes from the middle order output line 309B. These correspond to bits H and M of channel register 114 of FIG. 1A. Accordingly, when the line paging signal (CPGLIN) is activated, the H and M bit of register 114, 309 is substituted for virtual address bits 8 and 9 on output lines 302A and 303A respectively. Conversely, when the line paging signal (CPGLIN) is not activated (i.e., high,) then the address bits 8 and 9 of the virtual address are not modified and are passed as is to the output lines 302A and 303A of MUX's 302 and 303 respectively. This occurs because then CPGLIN is high and with LOGIC1 always being high, input address 3g and 3h are addressed on MUX's 302 and 303 respectively. Input address 3g of MUX 302 is CADU08 which is interpreted as the communication address of the microprocessor bit 8. Input address 3h of MUX 303 is CADU09 which is interpreted as the communication address microprocessor bit 9. When input terminals 3g and 3h are addressed, this becomes active and permits the addresses on that terminal to pass through to the output lines of 302A and 303A of MUX's 302 and 303.

The next control bit for modifying the virtual address 106 from the PROM chip 300 is the directional bit (CPGDIR). The directional bit is the low order bit D in channel register 114 and on line 309C of channel register 309. The directional bit becomes activated when addresses 8, 9, 10 and 11 (decimal) of the PROM 300 are addressed (See FIG. 1C). Additionally, when these bits 8-11 are addressed output signal CPGLIN also becomes active. Accordingly, in addition to the application of the CPGLIN signal to MUX's 302 and 303, there is an application of signal CPGDIR on input terminals 1d and 1ai of MUX's 301 and 304 respectively. With signal CPGDIR on input terminal 1ai of MUX 304 low, it makes no difference whether input signal CPGAD8 on input terminal 2ai of MUX 304 is high or low since under either condition, either input terminal 0b or 2b (addresses 00 or 10 binary) are activated and the CPGCND signal is applied to both these addresses. The origin of the CPGCND signal is from the output line 309C of channel register 309 which is the D bit of channel register 114 and channel register 309. Accordingly, when the directional bit CPGDIR is activated, the number 10 (decimal) bit of virtual address 106 is modified in accordance to the contents of the D bit of the channel register 114 or 309. There is no effect of the CPGDIR signal on the 1d input terminal of MUX 301 unless CPGAD8 signal is also activated. This is true because with signal CPGAD8 inactivated or high, only addresses 2e or 3e (10 or 11 binary) of MUX 301 can be addressed. They are both the same and represent bit 7 of the communication address of the microprocessor. However, when the CPGAD8 signal from PROM 300 is also activated (i.e., low,) then only address 0e or 1e (00 or 01 binary) of MUX 301 is addressed and becomes active; both these addresses have the logic signal 1 LOGIC1 applied which is permitted to pass to output line 301A of MUX 301 when both signal CPGAD8 and CPGDIR are active or only when CPGAD8 is active.

Hence with CPGAD8 active, bit 7 of virtual address is modified and forced to a one.

As described supra with respect to FIG. 1A, when the channel register bit (CPGCCB) is active or low then bits 11 and 12 of virtual address 106 are replaced by channel bits α and β of register 115. Since register 310 on FIG. 3 corresponds to channel register 115 and bit CPGCCH on output line 310A correspond to the α bit of channel register 115 and bit CPGCCL on output line 310B corresponds to the B bit of register 115 then these bits will replace bits 11 and 12 of the virtual address when the signal CPGCCB is active or low. Let's see how this happens. When the signal CPGCCB is activated, it is applied to the 11 input terminal of driver 306 and to one terminal of AND gate 311A. Accordingly, driver 306 is enabled and the channel control bit signals CPGCCH and CPGCCL on output lines 310A and 310B are applied to terminals 1n and 0n respectively of driver 306. They pass through to output line 306A and 306B of driver 306 and replace bits 11 and 12 of the virtual memory address. It should be noted that when the CPGCCB signal applied to input terminal 1 of driver 306 is low, it enables driver 306, but this same signal applied to the input terminal 19 of driver 305 disables driver 305. Hence the CADU11 and CADU12 signals on input terminals 24 and 25 respectively of driver 305 are not passed through to the output terminal 305A and 305B of driver 305, but rather are replaced by channel register 310 bits as previously described. Accordingly, it is seen that either driver 306 or 305 is enabled but not both, and either the channel register bits are passed through via driver 306, or the microprocessor address bits are passed through to the output via driver 305.

Finally with respect to the virtual address modification, the modification of bits 4, 5 and 6 will be discussed. As noted supra with respect to FIG. 1A, this is accomplished via signal CPGAD4. When address 12 (decimal) of Paging Signal Generator is addressed, all of the following signals become active. CPGLIN, CPGDIR, CPGCCB and CPGAD4. This is seen by referring to FIG. 1C where address 12 (decimal) contains the following 00001111. Hence bit positions 4, 5, 6 and 7 are low or active and from FIG. 1A ref. numeral 105: these correspond to signals CPGAD4, CPCGCCB, CPCDIR and CPGLIN respectively. It has already been shown how the first three signals modify the virtual address when they are active; and it will now be shown how the signal CPGAD4 modifies the virtual address and forces one's into bits 4, 5 and 6 of the virtual address. The CPGAD4 signal is applied to the enabling terminal 19 of driver 308. When driver 308 is not enabled (i.e., low,) then one's are forced for bits 4, 5 and 6 respectively. If it is enabled (i.e., high), then the microprocessor address CADU 4, 5 and 6 respectively will pass through. The reason for this is that driver 308 is a commercially available LS241 tri-state circuit which has pull up resistors for the signal applied. Accordingly, if a low signal such as CPGAD4 is applied, it does not enable driver 308 and the output signals are pulled up to +5 volts making it a logic 1. On the other hand, when CPGAD4 is not active it is high, thus it enables driver 308 and permits the address signal on input terminals 1k, 2k, and 3k respectively of driver 308.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A computer system having a paging apparatus for mapping virtual addresses to real addresses of a real memory, comprising:
    (a) a first means for generating a first predetermined number of virtual addresses;
    (b) signal means, coupled to said first means, for generating a set of control signals in response to said virtual addresses, said set of control signals having either a first or a second state, said second state having a plurality of selectable substates;
    (c) storage means containing address modification data; and
    (d) gating means, coupled to said first means and said storage means, for forming real addresses, said gating means responding to said set of control signals in said first state to form a real address equal to a first virtual address and responding to said set of control signals in a selected substate of said second state to form a real address from bits of said address modification data and from bits of a second virtual address, the number of bits of said address modification data and the number of bits of said second virtual address used to form said real address being determined by the selected substate of said set of control signals.

2. The paging apparatus as recited in claim 1 wherein said signal generating means includes activating means coupled to said first means which is responsive to said virtual addresses for generating a signal for activating said signal generating means.

3. The paging apparatus as recited in claim 2 wherein said signal generating means includes means responsive to said activating signal and to said virtual addresses for generating said plurality of control signals.

4. The apparatus as recited in claim 1 wherein said signal generating means is a read only memory.

5. The apparatus as recited in claim 4 wherein said gating means includes multiplexers and drivers.

6. In a computer system having a plurality of communication channels, a real memory for storing channel information, virtual addresses and real addresses for accessing said real memory, and an addressing apparatus for mapping said virtual addresses to said real addresses including:
    (a) a microprocessor for generating a set of virtual addresses corresponding to a first number of sets of real addresses, each set of real addresses referring to locations in said real memory where information for one of said plurality of channels is stored;
    (b) storage means containing address modification data corresponding to said sets of real addresses;
    (c) signal means, coupled to said microprocessor, for generating a set of control signals in response to said virtual addresses, said set of control signals having either a first or second state, said second state having a plurality of selectable substates; and (d) gating means, coupled to said microprocessor and said storage means, for forming real addresses, said gating means responding to said set of control signals in a selected substate of said first state to form a real address equal to a first virtual address and responding to said set of control signals in a selected substate said second state to form a real address from bits of said address modification data and from bits of a second virtual address, the bits of said address modification data and the bits of said second virtual address used to form said real address being determined by the selected substate of said set of control signals.

7. The addressing apparatus as recited in claim 6 wherein said signal generating means is a read-only memory.

8. The apparatus as recited in claim 7 wherein said storage means includes registers.

9. The apparatus as recited in claim 8 wherein said gating means includes multiplexers and drivers.

10. A computer system having a paging apparatus for mapping virtual addresses to real addresses of a real memory, comprising:

(a) a first means for generating a first predetermined number of virtual addresses;

(b) signal means, coupled to said first means, for generating a set of control signals in response to said virtual addresses, said set of control signals having either a first or a second state, said second state having a plurality of selectable substates;

(c) storage means containing address modification data; and (d) gating means, coupled to said first means and said storage means, for forming real addresses, said gating means responding to said set of control signals in said first state to form a real address equal to a first virtual address and responding to said set of control signals in a selected substate of said second state to form a real address from bits of said address modification data and from bits of a second virtual address, the bit positions of said real address which are supplied with bits from said second virtual address and with bits from said address modification data being determined by the selected substate of said set of control signals.

11. In a computer system having a plurality of communication channels, a real memory for storing channel information, virtual addresses and real addresses for accessing said real memory, and an addressing apparatus for mapping said virtual addresses to said real addresses including:

(a) a microprocessor for generating a set of virtual addresses corresponding to a first number of sets of real addresses, each set of real addresses referring to locations in said real memory where information for one of said plurality of channels is stored;

(b) storage means containing address modification data corresponding to said sets of real addresses;

(c) signal means, coupled to said microprocessor, for generating a set of control signals in response to said virtual addresses, said set of control signals having either a first or second state, said second state having a plurality of selectable substates; and (d) gating means, coupled to said microprocessor and said storage means, for forming real addresses, said gating means responding to said set of control signals in said first state to form a real address equal to a first-virtual address and responding to said set of control signals in a selected substate of said second state to form a real address from bits of said address modification data and from bits of a second virtual address, the bit positions of said real address which are supplied with bits from said second virtual address bits and with bits from said address modification data being determined by the selected substate of said set of control signals.

* * * * *